No Printed Specification Available
2041X
Z. PHINNEY.
SCALE.
Patented Jan. 6, 1814.
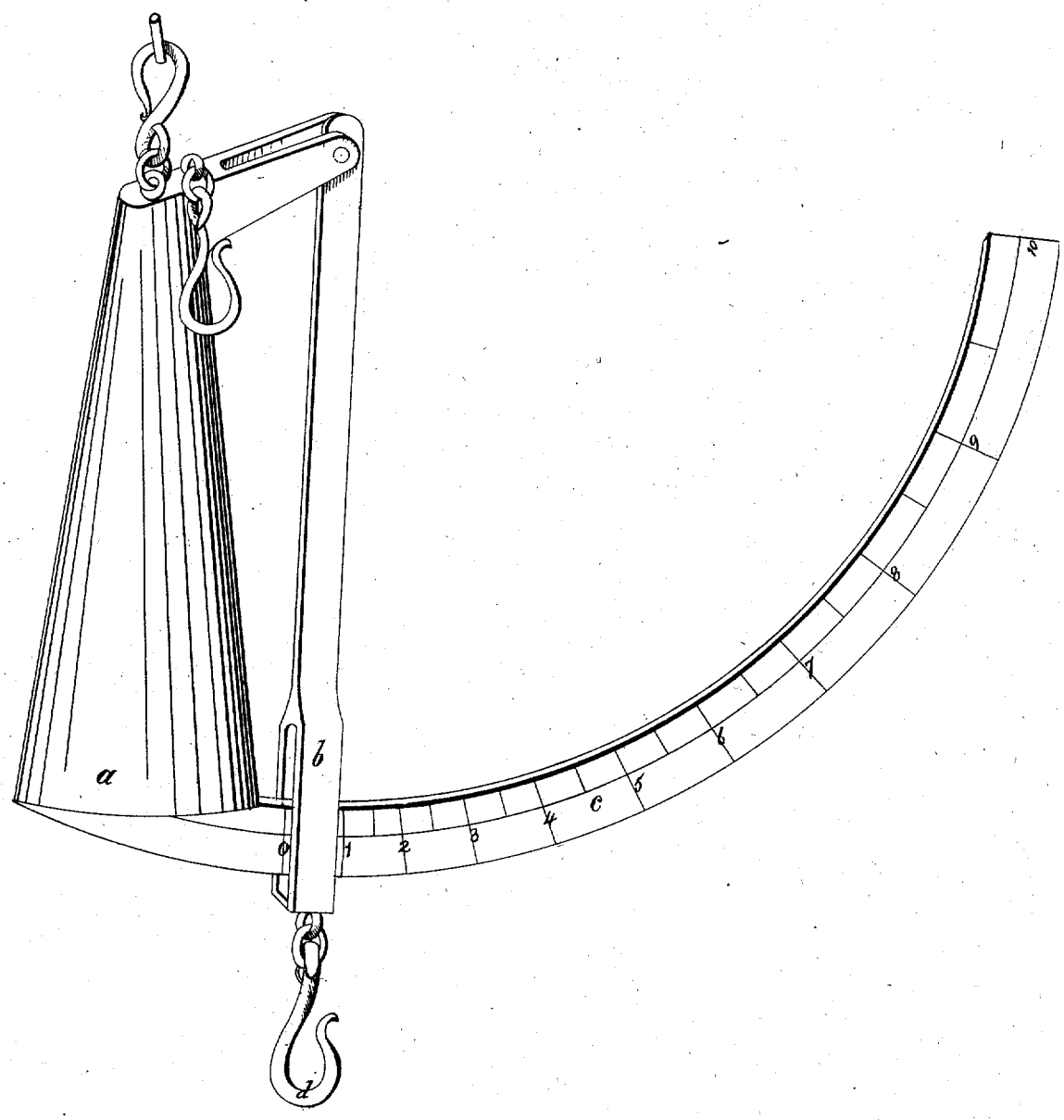

Jan 6 1814

Zina Phinney
Letters Patent

The Schedule referred to in these Letters Patent and making part of the same
containing a description in the words of the said Zina Phinney him
self of his improved Steel Yards or Scales.

This machine consists of a weight. a beam. or rod arm and one
scale, all of which are described as follows. viz<sup></sup>t The weight may be
made of various forms to answer the same purpose, but I calculate to
have it of a conical form, or an angular form as far up it as to the
fulcrum on which it is hung; and from it I have a kind of an arm
extending upwards in an angle of about 30 degrees altitude, this arm
may be varied agreeably to the size of the machine, that is to say, it
may be longer or shorter agreeably to the length of the weight, and there
is a mortice in the upper end of it to receive the upper end of the
rod, and there is a pin which goes through the upper arm of the weight and the end of the rod which supports and fixes them side by side. there may be a
second arm to the weight and of a circular form. and attached to
it near the bottom end, or it may be attached to the rod and pass
through a mortise in the weight, or slip by the side, or under the
lower end of the weight, or when attached to the lower end of the weight
it may pass by the side of the rod. The circular arm has marks
and figures on it, for to show the pounds and ounces. The scale is
hung to the lower end of the rod, and whatever is to be weighed be
ing put in it, it tends to pull the rod downwards. it has a tenden
cy to throw the lower end of the weight out of its perpendicular sit-
uation. which is the mode of weighing, and by looking at the edge of
the weight on the circular arm at the mark or figure on it, you
tell the weight of the article in the scale + There can also be
two hooks, one for the little side.

Zina Phinney

Witnesses
William Thornton
Geo Lyon (378 words)

Patented January 6. 1814